United States Patent Office 3,247,224
Patented Apr. 19, 1966

3,247,224
6H-[b,f] [1,4,5]DIBENZO-OXATHIAZEPINS
Edgar Enders and Friedrich Muth, Leverkusen-Bayerwerk, and Heinz Herlinger, Cologne-Flittard, Germany, assignors to Farbenfabriken Bayer Aktiengesellschaft, Leverkusen, Germany, a corporation of Germany
No Drawing. Filed Sept. 4, 1962, Ser. No. 221,304
Claims priority, application Germany, Sept. 6, 1961,
F 34,865
9 Claims. (Cl. 260—327)

The present invention relates to and has as its objects new and useful compounds. More specifically this invention relates to diaryl ether sultams with outstanding insecticidal properties, especially against moths and other textile pests, as well as processes for the production of these compounds. The new diaryl either sultams may be represented by the general formula

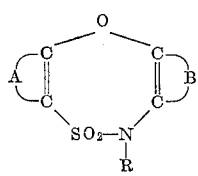

in which the symbols A and B stand for members required for the formation of an aromatic, optionally further substituted ring or ring system and R denotes a hydrogen atom, a preferably lower alkylradical or an aryl residue, preferably a lower aliphatic acyl or sulphonyl radical.

In accordance with the present invention it has now been found that the diaryl ether sultams of the above general formula which have not been known hitherto in the literature are obtained by the reaction of aromatic o-aminohydroxy compounds which may be further substituted in the nucleus, with aromatic o-halo-sulphonic acid halides which can also contain further nuclear substituents.

The reaction according to the present invention takes place according to the following scheme:

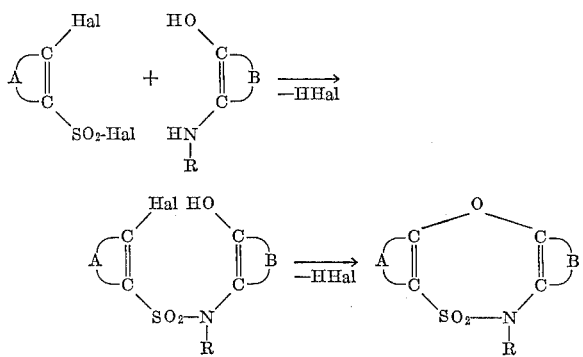

In this equation the radicals A, B and R have the same significance as given above.

As substituents of the radicals A and B, there may be mentioned for example: halogen atoms, trifluoromethyl-, nitro-, hydroxy-, alkyl-, alkoxy-, alkylmercapto-, carboxyl-, alkoxycarbonyl-, aminocarbonyl-, alkyl- or aryl-aminocarbonyl-, N,N-dialkyl- or N,N-diarylaminocarbonyl-, amino-, N-alkyl- or arylamino-, N,N-dialkyl- or N,N-diarylamino-groups and the like.

Aromatic o-aminohydroxy compounds which may especially be considered as starting materials for the process according to the present invention are o-aminophenols and -naphthols as well as the nuclear substitution products thereof. There may be mentioned for example: 2-amino-, 4-chloro-2-amino-, 4,6-dichloro-2-amino-, 3,4,6-trichloro-2-amino-, tetrachloro-2-amino-, 4-trifluoromethyl-, 4-nitro-2-amino-, 5-nitro-2-amino-, 4-chloro-5-nitro-2-amino- or 6-chloro-4-nitro-2-aminophenol, 2-aminophenol-4-sulphonic acid, 2-aminophenol-4-sulphamide, 2-aminophenol-4-carboxylic acid, 2-aminophenol-4-carboxylic acid anilide, 1-amino-2-hydroxy- and 1-amino-2-hydroxy-4-nitronaphthalene, 1 - amino-2-hydroxynaphthalene-4-sulphonic acid, 1-amino-2-hydroxyanthraquinone.

Aromatic o-halosulphonic acid halides suitable for the reaction according to the process are, for example: 2-chloro- and 2-bromobenzene sulphonic acid chloride, 2-chlorobenzene sulphonic acid bromide or fluoride, 5-nitro-2-chloro-, 3,5-dinitro-2-chloro-, 4,6-dichloro-3-nitro-, 5-trifluoro-methyl-2-chloro-, 3,4,5-trichloro- or pentachlorobenzene sulphonic acid chloride and 4,6-dichlorobenzene-1,3-disulphonic acid chloride.

The reaction according to the invention preferably takes place in the presence of acid-binding agents. For this pupose are suited, for example, basic organic solvents such as pyridine, quinoline, dimethylaniline, triethylamine or dimethylbenzylamine. The reaction can, moreover, be carried out also in inert solvents such as dioxan, tetrahydrofuran, acetone, dimethyl formamide, glycol dimethyl ether, or in water with the addition of organic or inorganic bases, for example sodium hydroxide solution, sodium carbonate, sodium hydrogen carbonate or sodium acetate.

In many cases, the reaction according to the invention yields first the open-chained o-haloaryl sulphonic acid-o'-hydroxyarylamides which can be isolated. These are converted by prolonged action of the acid-binding agents and/or at higher temperatures, optionally under the action of catalysts for splitting off hydrogen halide, such as copper bronze or copper-I-salts, to give the cyclic diaryl ether sultams.

It is surprising and was not to be expected that the described reaction would take place with twice splitting of hydrogen halide with the formation of a 7-membered ring.

On account of their insecticidal properties, those products of the process have proved especially valuable which are substituted in the aryl radicals by nitro or amino groups and/or halogen atoms, preferably chlorine atoms. In addition to the indicated method the aminated or halogenated diaryl ether sultams can also be prepared from the corresponding nitrosultams by reduction of the latter, for example by means of Raney nickel, and optionally by conversion of the amino compounds obtained into the corresponding halogen derivatives by means of nitrous acid and copper-I-chloride.

Furthermore it is possible to produce the last mentioned compounds by supplemental introduction of halogen in the synthesized diaryl ether sultam molecule with the aid of the usual halogenating agents, i.e. elementary chlorine, bromine or sulphuryl chloride. According to the reaction conditions applied (temperature, catalyst, excess of halogenating agent) stepwise halogenating of the nucleus occurs.

Finally the hydrogen both at the nitrogen atom of the heterocyclic nucleus of the diaryl ether sultams and in the amino groups linked to the aryl residues of the aminated compounds may be exchanged by alkylation or acylation with alkylating or acylating agents for alkyl or acyl radicals.

It has further been found that the compounds according to the present invention are obtained too if 2'-amino diphenyl-ether-2-sulfonic acids or the salts thereof are submitted to a ringforming reaction i.e. with phosphorus halides as phosphorus trichloride, phosphorus pentachloride or phosphorus oxychloride by the following equation

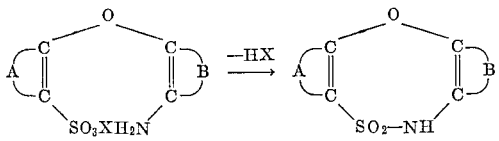

In the above mentioned equation the symbols A and B have the above significance, while X stands for hydrogen or an univalent cation.

The course of the ringforming reaction may be pursued with the aid of the infrared spectrum.

The diaryl ether sultams obtainable according to the present invention can be used as dyestuff intermediates, as pest control agents or as pharmaceuticals. The new compounds of this invention distinguish themselves by a good activity against moths and other textile pests. Moreover, they exhibit a general pesticidal (insecticidal) activity. In the latter respect they may be used in the same manner as other known compounds, i.e. in a concentration form about 0.00001% to about 1%, diluted or extended with suitable solid or liquid carriers or diluents. Examples of such solid carriers are talc, chalk, bentonite, clay and the like, as liquid carriers there may be mentioned water (if necessary with commercial emulsifiers), alcohols, especially lower alcohols such as methanol or ethanol, ketones, especially lower ketones such as acetone or methyl ethyl ketone, liquid hydrocarbons and the like. The new compounds may furthermore be used in combination with each other or with known insecticides, fertilizers etc.

The special utility of the inventive compounds, however, is in the field of the protection of keratinic material against the attack of moths and other textile pests. The compounds obtainable according to this invention are characterized by strong activity towards keratin pests and other harmful insects. The products of the processes are thereof preferably intended for use in the protection of materials containing keratin, particularly against moths and also against Anthrenus and Attagenus beetles. This is to be seen from the following example:

Textile material consisting of wool or fibres containing wool are treated in an acidic or neutral dyeing pitch with a solution of the sultam of the 4,4'-dichloro-2'-amino-diphenylether-2-sulphonic acid in an amount of 0.1 to 0.3% calculated on the weight of textile material. The treatment is carried out at first at temperatures of 30° C. and the temperature is slowly raised up to about 100° C. Textile material treated in this way is completely resistant against eating by keratin pests such as moth or larvae of Anthrenus and Attagenus beetles.

The following examples are given for the purpose of illustrating the present invention but without limiting it in any way:

EXAMPLE 1a

Sultam of the 4-nitro-2'-amino diphenyl ether-2-sulphonic acid

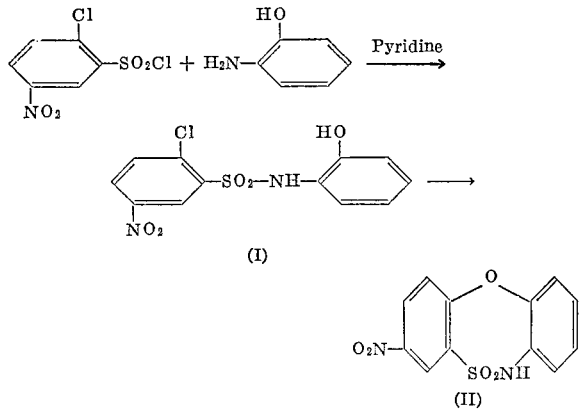

56 parts by weight of 2-aminophenol are dissolved in 250 parts by volume of pyridine, and 128 parts by weight of 6-chloro-3-nitrobenzene-sulfonic acid chloride are slowly introduced with stirring into this solution. After the mixture has been allowed to stand overnight, the red-coloured solution is stirred into dilute hydrochloric acid and the precipitated product of the reaction is recrystallized first from glacial acetic acid and then from toluene. The yield amounts to 110 parts by weight (75% of the theoretical). The compound is soluble in a dilute solution of sodium carbonate and possesses a melting point of 156 to 158° C.

Analysis.—Calculated for $C_{12}H_8N_2O_5S$ (molecular weight 292.2): N, 9.6%; S, 10.95%. Found: N, 9.6%, 9.7%; S, 11.0%.

If the reaction described above is carried out at 10° C. and the mixture worked up immediately after disappearance of the 3-aminophenol by pouring into dilute hydrochloric acid, the open-ring sulphonic acid anilide of Formula I with a melting point of 212 to 217° C. is obtained. By dissolving in pyridine and allowing the mixture to stand, the sultam (II) is finally obtained. The infrared spectra of the two compounds (I) and (II) are differing from each other in the expected manner.

Analysis.—Calculated for $C_{12}H_9N_2O_5SCl$ (molecular weight 328.5): S, 9.74%. Found: S, 9.70%.

EXAMPLE 1b

Sultam of the 2',4-diamino diphenyl ether-2-sulphonic acid

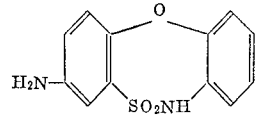

A solution of 96 parts by weight of the nitro compound prepared according to the instructions of Example 1a in 250 parts by volume of methanol is hydrogenated, after addition of 20 parts by weight of Raney nickel, in an autoclave fitted with stirrer at 70° C. and at a hydrogen pressure of 40 atmospheres, until the decrease in pressure is finished. After cooling down and releasing the pressure, the catalyst is filtered off from the reaction mixture, the methanol is evaporated under vacuum and the residue is dissolved in water with addition of the required quantity of sodium hydroxide solution. The resulting solution is subsequently filtered, rendered acid with dilute acetic acid and the precipitated product of the reaction is recrystallized from methanol. The yield is 66 parts by weight (76% of the theoretical), M.P. 180 to 182° C.

Analysis.—Calculated for $C_{12}H_{10}N_2O_3S$ (molecular weight 226.28): C, 55.0%; H, 3.8%; N, 10.7%; S, 12.2%. Found: C, 54.65%, 54.68%; H, 4.09%, 4.18%; N, 10.38%, 10.64%; S, 12.15%.

EXAMPLE 1c

Sultam of the 4-chloro-2'-amino-diphenyl-ether-2-sulphonic acid

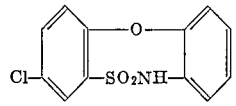

55.5 parts by weight of the amino compound obtained according to Example 1b are stirred with 200 parts by volume of concentrated hydrochloric acid and subsequently treated dropwise at 5° C. with a solution of 16 parts by weight of sodium nitrite in 50 parts by volume of water. After the diazotization is finished, the mixture is introduced at 0° C. into a solution of 23 parts by weight of copper-O-chloride in 300 parts by volume of hydrochloric acid, intense foaming taking place, the temperature is slowly increased to 25° C. and the reaction mixture subsequently stirred for another 12 hours at the same temperature. The mixture is thereafter heated for a short time to 60 to 70° C., the product of the reaction, after cooling, filtered off with suction and washed with water. The compound of the above formula can be recrystallized from dilute methanol. It melts at 104 to 106° C. The yield amounts to 42 parts by weight.

*Analysis.*—Calculated for $C_{12}H_8ClNO_3S$ (molecular weight 281.71): Cl, 12.6%; N, 5.0%. Found: Cl, 13.3%; N, 5.08%, 5.38%.

EXAMPLE 1d

*Sultam of the 4,4'-dichloro-2'-amino diphenyl-ether-2-sulfonic acid*

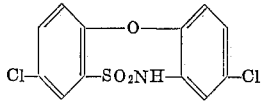

By chlorination of the compound obtainable according to EXAMPLE 1c with sulfuryl chloride in acetic acid there is obtained the product of the above formula of melting point 133 to 135° C.

*Analysis.*—Calculated for $C_{12}H_7Cl_2NO_3S$ (molecular weight 316): Cl, 22.40%. Found: Cl, 22.7%.

EXAMPLE 1e

*Sultam of the 3',4',4',6,6'-pentachloro-2'-amino-diphenylether-2-sulfonic acid*

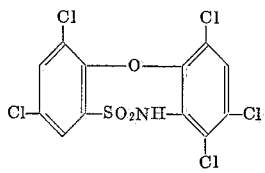

By chlorination of the compound obtainable according to Example 1c with elementary chlorine in o-dichlorobenzene at 40° C. and in the presence of iron-III-chloride the product of the above formula is obtained (melting point after recrystallisation from acetic acid 226° C.).

*Analysis.*—Calculated for $C_{12}H_4Cl_5NO_3S$ (molecular weight 419.5): C, 34.4; H, 0.96%; N, 3.34%; Cl, 42.3%. Found: C, 34.5%; H, 1.16%; N, 3.47%; Cl, 42.45%.

From the mother liquor there may be obtained after distilling off the dichlorobenzene and recrystallisation of the residue from acetic acid a product of melting point 228° C. According to the analysis and the infrared spectrum this compound is the sultam of the thexachloro-2'-aminodiphenylether-2-sulfonic acid i.e. a compound of the formula

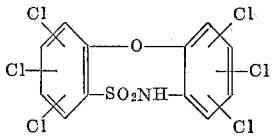

*Analysis.*—Calculated for $C_{12}H_3NO_3Cl_6S$ (molecular weight 454): C, 31.8%; H, 0.55%; N, 3.10%; Cl, 47.0%. Found: C, 32.08%; H, 1.20%; N, 2.5%; Cl, 48.0%.

EXAMPLE 1f

*Sultam of the 4-acetamido-2'-amino-diphenylether-2-sulfonic acid*

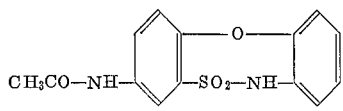

The compound may be produced by acetylation of the product according to Example 1b with acetic acid anhydride. It melts at 270° C.

*Analysis.*—Calculated for $C_{14}H_{12}N_2O_4$ (molecular weight 304): C, 55.3%; H, 3.95%; N, 9.2%. Found: C, 55.7%; H, 4.35%; N, 9.13%.

EXAMPLE 1g

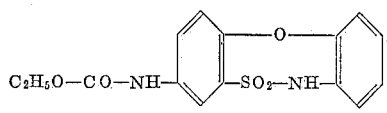

By acetylation of the sultam obtainable according to Example 1b with diethyl pyro carbonate there is obtained the sultam of the 4-carbethoxamido-2'-amino-diphenyl-ether-2-sulfonic acid of melting point 194° C.

*Analysis.*—Calculated for $C_{15}H_{14}N_2O_5S$ (molecular weight 334): C, 54.0%; H, 4.2%; N, 8.4%. Found: C, 53.8%; H, 4.42%; N, 8.30%.

In an analogous manner there is obtained the sultam of the 4-methane sulfonyl amino-2'-amino-diphenylether-2-sulfonic acid of the following formula

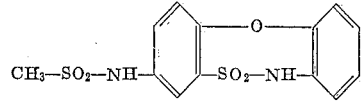

of melting point 217 to 219° C.

*Analysis.*—Calculated for $C_{13}H_{12}N_2O_5S_2$ (molecular weight 340): C, 45.95%; H, 3.54%; N, 8.25%. Found: C, 46.14%; H, 3.51%; N, 8.15%.

EXAMPLE 1h

By methylation of the sultam obtainable according to Example 1a with dimethyl sulfate in sodium hydroxide there is obtained the sultam of the 4-nitro-2'-methyl amino diphenylether-2-sulfonic acid of melting point 143 to 145° C.

*Analysis.*—Calculated for $C_{13}H_{10}N_2O_5S$ (molecular weight 306): C, 51.0%; H, 3.27%; N, 9.15%. Found: C, 50.8%; H, 3.19%; N, 9.28%.

The catalytic reduction of the last mentioned compound in the presence of Raney nickel there is obtained the sultam of the 4-amino-2'-methylamino-diphenyl ether-2-sulfonic acid of the following formula

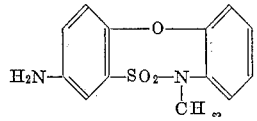

of melting point 197 to 199° C.

*Analysis.*—Calculated for $C_{13}H_{12}NO_2O_3S$ (molecular weight 226): C, 56.5%; H, 4.35%; N, 10.15%. Found: C, 56.47%; H, 4.55%; N, 10.27%.

The same compound is obtainable by methylation of the sultam of Example 1b with dimethyl sulfate and sodium hydroxide solution.

EXAMPLE 1i

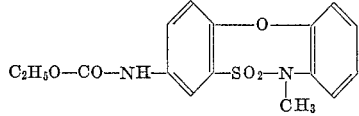

The sultam of the 4-carbethoxamido-2'-methylamino-diphenylether-2-sulfonic acid of melting point 143° C. results for the sultam of 4-amino-2'-methylamino-diphenylether-2-sulfonic acid by acylation with diethylpyrocarbonate in ethyl alcohol.

*Analysis.*—Calculated for $C_{16}H_{16}N_2O_5S$ (molecular weight 348): C, 55.2%; H, 4.50%; N, 8.05%. Found: C, 55.27%; H, 4.90%; N, 8.11%.

EXAMPLE 2

*Sultam of the 4,4'-dichloro-2'-aminodiphenyl ether-2-sulfonic acid*

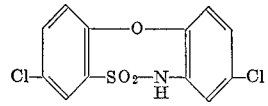

50 parts by weight of 4,4'-dichloro-2'-amino-diphenyl ether sulfonic acid sodium salt are heated to 140° C. in a mixture of 29 parts by weight of phosphorus penta chloride and 200 parts by weight of phosphorus oxychloride. After distilling off the phosphorus oxide the reaction mixture is taken up in chloroform. The cholorform solution poured into ice water and subsequently the mixture is stirred for 2 hours. The chloroform is removed by distillation off and is recrystallised from acetic acid. The sultam of the 4,4'-dichloro-2'-amino-diphenyl ether-2-sulfonic acid in the infrared spectrum shows an absorption band at 3220 cm.$^{-1}$ which is characteristic for the sultam amide group and does not appear at the ring open free acid or the sodium salt thereof. The product is according to the infrared spectrum and the melting point identical with the compound obtainable from the sultam of the 4-chloro-2'-amino-diphenylether-2-sulfonic acid by chlorination with sulfuryl chloride.

We claim:
1. A compound of the following formula:

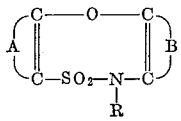

wherein
R is a member selected from the group consisting of hydrogen and lower alkyl;
A is the residue of an aryl moiety selected from the group consisting of a chlorophenyl having 1–4 chloro substituents; nitro phenyl, dinitro phenyl, nitrochloro phenyl, chloro-trifluoromethyl phenyl, amino phenyl, lower alkylamino phenyl, lower alkyl carbonylamino phenyl, ethoxycarbonylamino phenyl, lower alkyl sulfonylamino phenyl and phenyl; and
B is the residue of an aryl moiety selected from the group consisting of a chlorophenyl having 1–4 chloro substituents, trifluoromethyl phenyl, nitro phenyl, chloro-nitro phenyl, sulfamido phenyl, lower alkanoylamino phenyl, and phenyl.

2. A compound of the following formula:

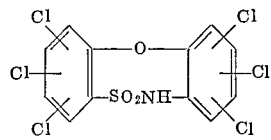

3. A compound of the following formula:

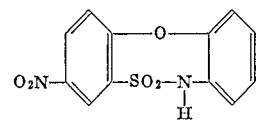

4. A compound of the following formula:

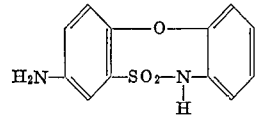

5. A compound of the following formula:

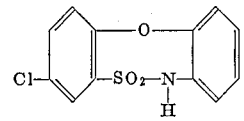

6. A compound of the following formula:

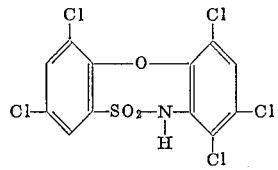

7. A compound of the following formula:

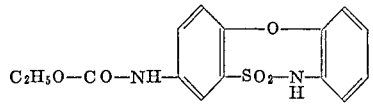

8. A compound of the following formula:

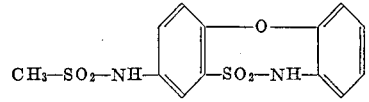

9. A compound of the following formula:

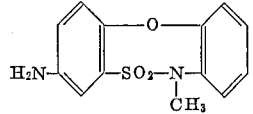

No references cited.

WALTER A. MODANCE, *Primary Examiner.*
NICHOLAS RIZZO, JOHN D. RANDOLPH,
*Examiners.*
JAMES A. PATTEN, *Assistant Examiner.*